Oct. 2, 1956 — R. L. OAKLEY — 2,765,132
DUAL PARACHUTE ASSEMBLY
Filed Oct. 15, 1954
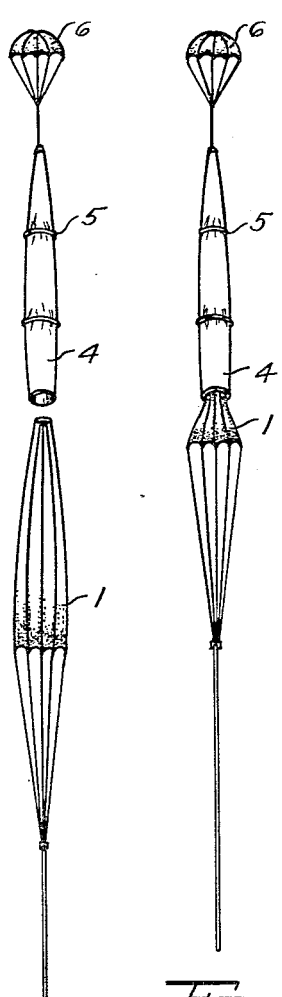
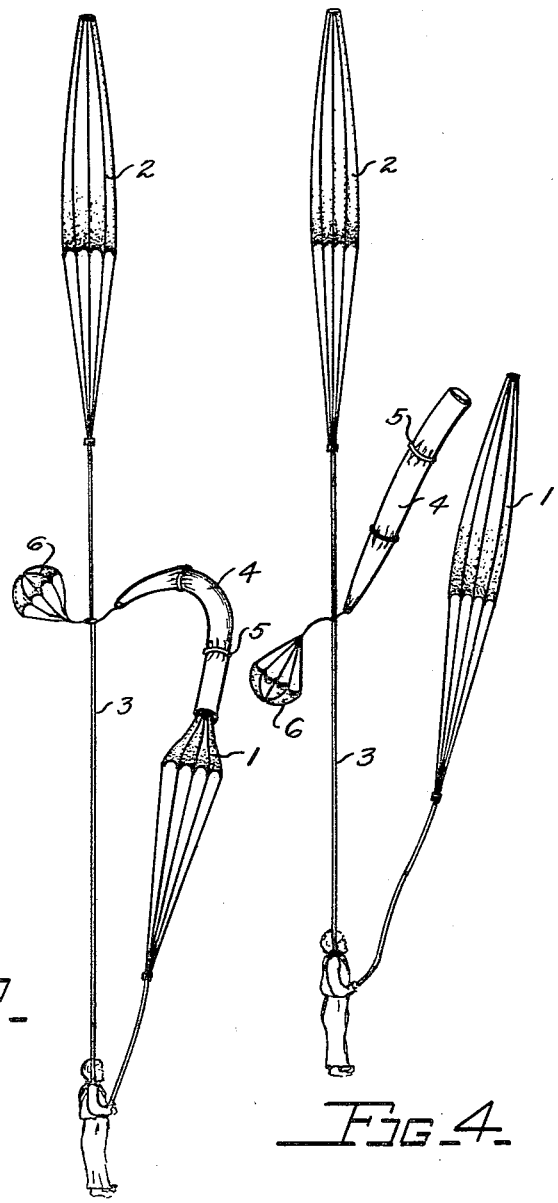
INVENTOR.
ROBERT L. OAKLEY
BY Wade Koontz AND
Charles H. Wagner
ATTORNEYS

United States Patent Office 2,765,132
Patented Oct. 2, 1956

2,765,132

DUAL PARACHUTE ASSEMBLY

Robert L. Oakley, Genoa, Nebr.

Application October 15, 1954, Serial No. 462,636

4 Claims. (Cl. 244—142)

(Granted under Title 35, U. S. Code (1952), sec. 266)

The invention described herein may be manufactured and used by or for the United States Government for governmental purposes without payment to me of any royalty thereon.

This invention relates to improvements in deploying means for the reserve canopy of the troop type dual parachute assembly.

Dual parachute assemblies presently in use are equipped with a main canopy and a reserve canopy having a pilot parachute fixedly attached thereto by a nylon tie cord. Upon failure of the main canopy, the reserve canopy is deployed. Should the pilot parachute of the reserve canopy foul in the suspension lines of the main canopy or other parts of the apparatus, the reserve canopy will fail to inflate since its apex will be held down toward the fouled pilot chute by the tie cord.

It is an object of this invention to provide means for deploying a reserve canopy in the event of failure of the main canopy to open.

It is a further object to provide such means which will preclude failure of the reserve canopy to inflate due to entangling of the reserve canopy pilot parachute with the man, his equipment, or with the main canopy or suspension lines thereof.

These and other objects are achieved by the use of a fabric sleeve to which the pilot parachute is attached and into which the upper portion of the reserve canopy is detachably stowed and loosely held by elastic or tie retaining means. If the pilot parachute becomes fouled the reserve canopy will still be deployed by the air drag upon it since it is not fixedly attached to the pilot parachute. The increase in safety of operation is obvious.

The invention may be more fully understood by reference to the accompanying drawings forming a part of this application and in which:

Fig. 1 is an exploded view of the component parts of the assembly;

Fig. 2 shows the reserve canopy assembly;

Fig. 3 shows the reserve pilot chute fouled with the lines of the main canopy;

Fig. 4 shows the reserve canopy released.

In the drawings, 1 designates a reserve canopy of a dual parachute assembly having a main canopy 2, with shroud lines 3 thereon. When the dual parachute assembly is packed, the upper portion of the reserve canopy 1 is placed within a retaining sleeve 4 and is loosely held therein by the elastic or tie retainer 5. Fixedly attached to the sleeve 4 is a reserve canopy pilot chute 6.

In operation the pilot chute 6 of the reserve canopy 1 is released from the dual assembly pack by any conventional means if for any reason the main canopy 2 fails to inflate. Pilot chute 6 will pull the sleeve 4 and reserve canopy 1 therein with it thus deploying the reserve canopy from the pack. Should the pilot chute 6 become fouled in any part of the equipment, such as the shroud lines 3 of the main canopy 2, the reserve canopy 1 will by this invention still be successfully deployed since it is easily separated from the pilot chute 6 and retaining sleeve 4 by air drag on the reserve canopy 1. In the conventional dual assembly parachute, the reserve canopy 1 being fixedly attached to the pilot chute 6 fails to inflate if the pilot chute becomes fouled since its apex will be held down toward the fouled pilot chute.

This situation is avoided by the present invention as may be seen in Figs. 3 and 4. In Fig. 3 the pilot chute is shown as it initially becomes fouled in the shroud lines 3 of main canopy 2. Reserve canopy 1 is still held by fabric sleeve 4 and retaining members 5. Shortly after fouling, however, the force of the air drag on reserve canopy 1 will be sufficient to pull it free from sleeve 4 and retainers 5 as is shown in Fig. 4. Thereafter the reserve canopy 1 is free to open in normal fashion and carry the parachutist to safety.

It is obvious that modifications of this invention will be apparent to those skilled in the art. The foregoing disclosure is intended as exemplary only and is not intended to limit the scope of the invention which is defined solely by the appended claims.

What I claim is:

1. In a dual parachute assembly, a main canopy connected to a load, a reserve canopy connected to the load, a pilot chute for deploying said reserve canopy, a sleeve member fixedly attached to said pilot chute, a part of said reserve canopy being detachably packed within said sleeve member, and frictional retaining means loosely holding said part of said reserve canopy within said sleeve member.

2. In a dual parachute assembly, a main canopy connected to a load, a reserve canopy connected to the load, a pilot chute, and a member frictionally retaining said reserve canopy to said pilot chute whereby said reserve canopy may be easily released from the pilot chute by air drag alone if said pilot chute becomes fouled.

3. In a dual parachute assembly, a main canopy having shroud lines connected to a load, a reserve canopy connected to the load, said reserve canopy adapted to be released in the event of failure of the main canopy, a sleeve member, a part of said reserve canopy being detachably packed within said sleeve member, elastic retaining means loosely holding said part of said reserve canopy within said sleeve member, and a pilot chute fixedly attached to said sleeve member whereby upon said pilot chute becoming fouled in any part of the assembly, the reserve canopy will be deployed from said sleeve member by air drag.

4. In a dual parachute assembly, a main canopy connected to a load, a reserve canopy connected to the load, a pilot chute, and means detachably connecting said pilot chute to a part of said reserve canopy.

References Cited in the file of this patent

UNITED STATES PATENTS

| | | |
|---|---|---|
| 2,403,832 | Smith | July 9, 1946 |
| 2,405,333 | Sheridan | Aug. 6, 1946 |
| 2,536,777 | Smith | Jan. 2, 1951 |

FOREIGN PATENTS

| | | |
|---|---|---|
| 423,020 | Italy | July 2, 1947 |
| 605,738 | France | Feb. 22, 1926 |